UNITED STATES PATENT OFFICE.

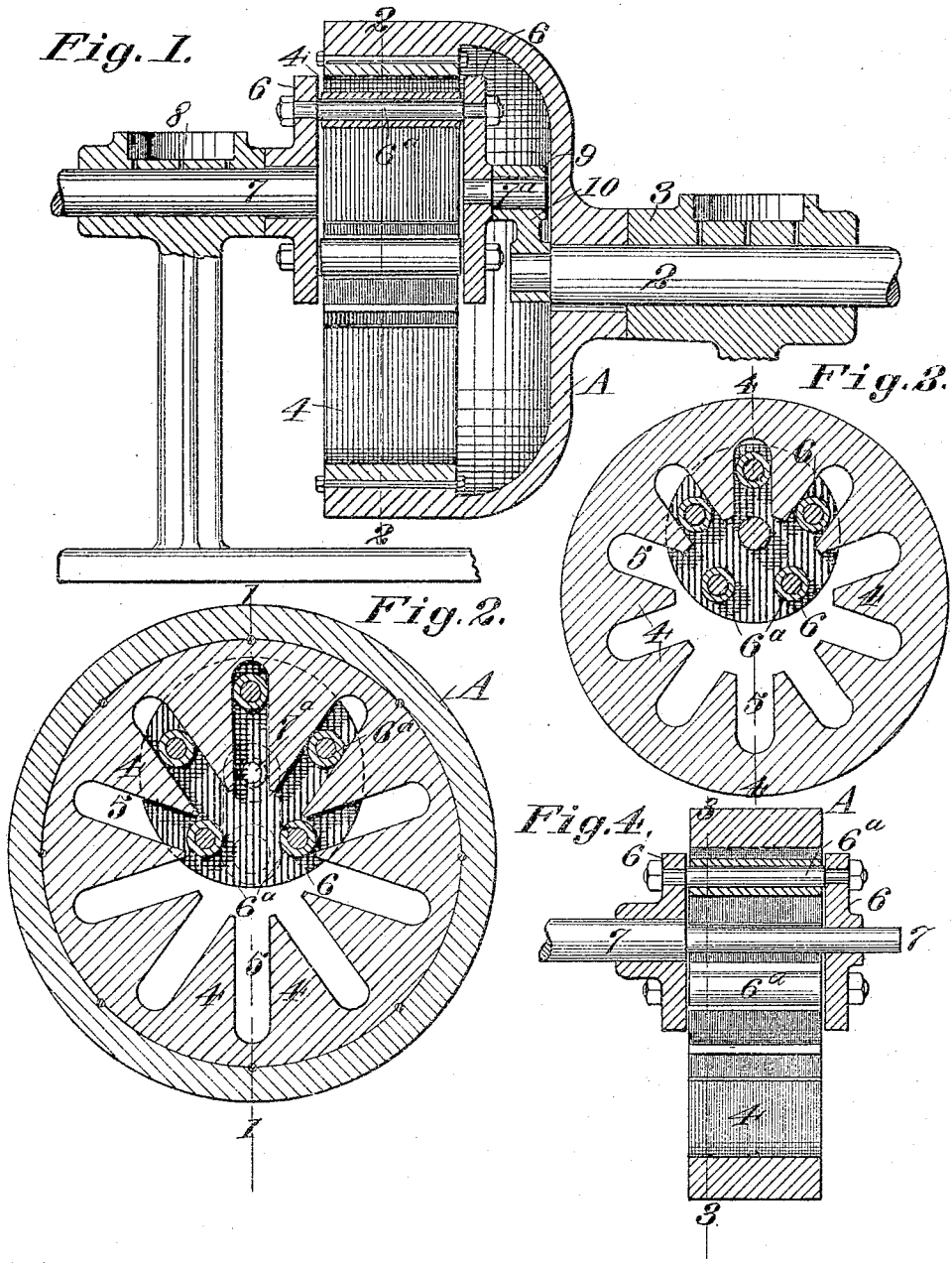

THOMAS J. LOFTUS, OF CASTELLA, CALIFORNIA, ASSIGNOR OF ONE-HALF TO HARMON BELL, OF OAKLAND, CALIFORNIA.

TRANSMISSION-GEARING.

1,199,398.  Specification of Letters Patent.  Patented Sept. 26, 1916.

Application filed March 13, 1916. Serial No. 83,810.

*To all whom it may concern:*

Be it known that I, THOMAS J. LOFTUS, a citizen of the United States, residing at Castella, in the county of Shasta and State of California, have invented new and useful Improvements in Transmission-Gearing, of which the following is a specification.

My invention relates to improvements in gearing designed for various purposes, which may be utilized for motors, air compressors and the transmission of power.

It consists of a cylindrical member having inwardly extending radial slots with parallel sides, pins extending between the peripheries of its exterior plates, and adapted to move through the slots, so that power may be transmitted from either one gear to the other. The lantern gear is supported upon shafts or axes terminating in the side plates and journaled out of line with the shaft of the toothed gear, with which the pins of the lantern gear engage, which admits of the inwardly projecting teeth of the slotted member being extended beyond the center of the shaft of the lantern gear, and thus to maintain a large proportion of the teeth in engagement with those of the circumscribing gear.

It also comprises details of construction which will be more fully explained by reference to the accompanying drawings, in which—

Figure 1 is a view taken on the line 1—1 of Fig. 2. Fig. 2 is a section on line 2—2 of Fig. 1. Fig. 3 is a section on line 3—3 of Fig. 4. Fig. 4 is a section on line 4—4 of Fig. 3.

As shown in the drawings, A is an external shell, here shown as mounted upon a shaft 2 journaled in a suitable box or bearing, as shown at 3, and an interior gear with a number of teeth 4, the bases of which are formed in the exterior portion, and the sides of these teeth converge radially toward the axis of the gear, so that between the sides of these teeth are formed channels 5, the inner sides of which are parallel as shown.

6—6 are the end plates of a lantern gear supported on shafts 7—7ª, the ends of which terminate in the plates 6. The part 7 is supported in a bearing 8 and the part 7ª in a bearing 9, in one end of a bearing link 10, in the other end of which the shaft 2 is turnable. The end plates 6 of the lantern gear are located upon opposite sides of the slotted cylinder 4 and pins 6ª extend between these plates near the periphery. The pins pass through the slots 5 of the cylinder and by reason of the position of their axis, they reciprocate from one end to the other of the channels 5, between the teeth 4, during the revolutions of the apparatus.

By the construction here shown, with the shafts 7—7ª not extending between the plates 6, the teeth 4, in the internal gear, may be of very great length, and it will be seen from this that any individual pin or roll, on entering a slot 5, between these internal gear teeth, will remain in driving contact for nearly four-fifths of a revolution of the lantern gear and for nearly one-half of a revolution of the internal gear, thus making the gear almost noiseless and giving phenominal wearing surface. It will also be noticed that a considerable number of these rolls are in working contact with the sides of the channels for a great proportion of the time.

The internal gear may be formed with any even number of slots, as ten or twelve, but in such case a number of pins or rolls in the lantern gear must be one-half the number of slots of the internal gear.

When it is desired to have the slots of any unusual length, it is absolutely necessary that the center about which the rolls or pins pass in their rotation, should be such that the center of these rolls will pass through the center of the internal gear A.

As shown in Figs. 3 and 4, the teeth 4 are made shorter, so that the shaft 7 of the lantern gear may pass through both plates 6, and the out bearing of this shaft may then be located outside of the right-hand plate.

Having thus described my invention, what I claim and desire to secure by Letters Patent is—

1. A mechanism consisting of a cylindrical shell, a central axis, and a bearing shaft to which one end of the shell is fixed, a central cylindrical member in the outer end of the shell, having radial slots with parallel sides, pins extending through the slots, said pins having their ends fixed in disks, shafts upon which the disks are mounted exterior to the ends of the slotted center, said shafts being revoluble parallel, and eccentric to the main shaft, and the pins reciprocating in the slots during revolution.

2. A mechanism comprising a cylindrical shell with one closed end and a shaft to which said shell is fixed, a cylindrical member fixed in the opposite end of the shell and having parallel sided radial slots, disks mounted and revoluble on alined shafts exterior to the slotted cylinder and eccentric to the main shaft, and roller pins fixed in the disks, extending through the slots, and reciprocable therein, coincident with the revolution of the shafts.

3. In a device of the character described, a cylindrical shell, and a journaled shaft to which one end is fixed, a cylindrical member in the opposite end of the shell having radial, parallel sided slots from the periphery toward the center, a bearing link extending from the main shaft within the shell and having a short shaft, a shaft journaled at the opposite end of the slotted cylinder, and in line with the shaft, disks carried by said shafts, roller pins fixed in the disks and extending through the slots, so as to reciprocate in the slots in unison with the revolutions of the shafts.

4. In a mechanism of the character described, a cylindrical shell, having a closed end and a centrally journaled shaft upon which it is fixed, a radially slotted cylinder fixed in the outer end of the shell, with a space between its inner end and the closed end of the shell, a bearing link in one end of which the main shaft is turnable, a short shaft in the opposite end of the arm, a shaft journaled in line with said pin shaft, and outside of the slotted cylinder, disks fixed to said alined shafts contiguous to the opposite ends of the cylinder, and roller pins fixed in the disks, so as to reciprocate in the radial slots during the revolution of the shafts.

In testimony whereof I have hereunto set my hand in the presence of two subscribing witnesses.

THOMAS J. LOFTUS.

Witnesses:
A. H. SMYTHE,
J. A. BELL.

Copies of this patent may be obtained for five cents each, by addressing the "Commissioner of Patents, Washington, D. C."